United States Patent
Mahapatra et al.

(10) Patent No.: US 12,159,109 B2
(45) Date of Patent: Dec. 3, 2024

(54) PRE-TRAINING TECHNIQUES FOR ENTITY EXTRACTION IN LOW RESOURCE DOMAINS

(71) Applicant: ADOBE INC., San Jose, CA (US)

(72) Inventors: Aniruddha Mahapatra, Kolkata (IN); Sharmila Reddy Nangi, Telangana (IN); Aparna Garimella, Telangana (IN); Anandha velu Natarajan, Tamil Nadu (IN)

(73) Assignee: Adobe Inc., San Jose, CA (US)

( * ) Notice: Subject to any disclaimer, the term of this patent is extended or adjusted under 35 U.S.C. 154(b) by 613 days.

(21) Appl. No.: 17/525,311

(22) Filed: Nov. 12, 2021

(65) Prior Publication Data

US 2023/0153533 A1 May 18, 2023

(51) Int. Cl.
| | |
|---|---|
| G06F 40/289 | (2020.01) |
| G06F 18/214 | (2023.01) |
| G06F 40/211 | (2020.01) |
| G06F 40/284 | (2020.01) |
| G06F 40/30 | (2020.01) |
| G06F 40/42 | (2020.01) |
| G06F 18/22 | (2023.01) |

(52) U.S. Cl.
CPC .......... *G06F 40/289* (2020.01); *G06F 18/214* (2023.01); *G06F 40/211* (2020.01); *G06F 40/284* (2020.01); *G06F 40/30* (2020.01); *G06F 40/42* (2020.01); *G06F 18/22* (2023.01)

(58) Field of Classification Search
CPC .... G06F 40/289; G06F 18/214; G06F 40/211; G06F 40/284; G06F 40/30; G06F 40/42; G06F 18/22

USPC .......................................................... 704/9
See application file for complete search history.

(56) References Cited

U.S. PATENT DOCUMENTS

| | | | | |
|---|---|---|---|---|
| 10,467,526 B1* | 11/2019 | Appalaraju | .......... | G06V 10/774 |
| 11,262,978 B1* | 3/2022 | Cohen | .................... | G06F 16/907 |
| 2023/0153533 A1* | 5/2023 | Mahapatra | ............ | G06F 40/284 |
| | | | | 704/9 |

FOREIGN PATENT DOCUMENTS

| | | | | |
|---|---|---|---|---|
| CN | 108595629 A | * | 9/2018 | .......... G06K 9/6215 |
| CN | 109740123 A | * | 5/2019 | |
| CN | 109815345 A | * | 5/2019 | |

(Continued)

OTHER PUBLICATIONS

Tallo, Philip Thomas. "Using Sentence Embeddings for Word Sense Induction." Master's thesis, University of Cincinnati, 2020.*

(Continued)

*Primary Examiner* — Edwin S Leland, III
(74) *Attorney, Agent, or Firm* — Shook, Hardy & Bacon L.L.P.

(57) ABSTRACT

Embodiments of the present invention provide systems, methods, and computer storage media for pre-training entity extraction models to facilitate domain adaptation in resource-constrained domains. In an example embodiment, a first machine learning model is used to encode sentences of a source domain corpus and a target domain corpus into sentence embeddings. The sentence embeddings of the target domain corpus are combined into a target corpus embedding. Training sentences from the source domain corpus within a threshold of similarity to the target corpus embedding are selected. A second machine learning model is trained on the training sentences selected from the source domain corpus.

20 Claims, 7 Drawing Sheets

(56) References Cited

FOREIGN PATENT DOCUMENTS

| CN | 110232118 | A | * | 9/2019 | |
| CN | 110347857 | A | * | 10/2019 | ............. G06F 16/55 |
| CN | 111008531 | A | * | 4/2020 | ........... G06N 3/0454 |
| CN | 111309930 | A | * | 6/2020 | ........... G06F 16/367 |
| CN | 111339275 | A | * | 6/2020 | ......... G06F 16/3329 |
| CN | 112214610 | A | * | 1/2021 | ............. G06F 16/35 |
| CN | 107832781 | B | * | 9/2021 | ........... G06K 9/6218 |
| CN | 111309930 | B | * | 2/2023 | ........... G06F 16/367 |
| CN | 111008531 | B | * | 5/2023 | ........... G06N 3/0454 |
| CN | 113673354 | B | * | 2/2024 | ........... G06F 18/214 |

OTHER PUBLICATIONS

Parcheta, Zuzanna, German Sanchis-Trilles, Francisco Casacuberta, and Robin Rendahl. "Combining embeddings of input data for text classification." Neural Processing Letters 53, No. 5 (2021): 3123-3151.*

Aharoni, R., & Goldberg, Y. (2020). Unsupervised domain clusters in pretrained language models. arXiv preprint arXiv:2004.02105.

Chiu, J. P., & Nichols, E. (2016). Named entity recognition with bidirectional LSTM-CNNs. Transactions of the Association for Computational Linguistics, 4, 357-370.

Dernoncourt, Franck, and Ji Young Lee. "Pubmed 200k rct: a dataset for sequential sentence classification in medical abstracts." arXiv preprint arXiv:1710.06071 (2017).

Kenton, J. D. M. W. C., & Toutanova, L. K. (May 2019). Bert: Pre-training of deep bidirectional transformers for language understanding. In Proceedings of NAACL-HLT (pp. 4171-4186).

Gururangan, Suchin, et al. "Don't stop pretraining: adapt language models to domains and tasks." arXiv preprint arXiv:2004.10964 (2020).

Huang, Kexin, Jaan Altosaar, and Rajesh Ranganath. "Clinicalbert: Modeling clinical notes and predicting hospital readmission." arXiv preprint arXiv:1904.05342 (2019).

Jia, C., Liang, X., & Zhang, Y. (Jul. 2019). Cross-domain NER using cross-domain language modeling. In Proceedings of the 57th Annual Meeting of the Association for Computational Linguistics (pp. 2464-2474).

Jia, C., & Zhang, Y. (Jul. 2020). Multi-Cell compositional LSTM for NER domain adaptation. In Proceedings of the 58th Annual Meeting of the Association for Computational Linguistics (pp. 5906-5917).

Lee, J., Yoon, W., Kim, S., Kim, D., Kim, S., So, C. H., & Kang, J. (2020). BioBERT: a pre-trained biomedical language representation model for biomedical text mining. Bioinformatics, 36(4), 1234-1240.

Li, Jing, et al. "A survey on deep learning for named entity recognition." IEEE Transactions on Knowledge and Data Engineering (2020).

Lin, Bill Yuchen, and Wei Lu. "Neural adaptation layers for cross-domain named entity recognition." arXiv preprint arXiv:1810.06368 (2018).

Liu, Zihan, et al. "CrossNER: Evaluating Cross-Domain Named Entity Recognition." arXiv preprint arXiv:2012.04373 (2020).

Uzuner, Ö., Luo, Y., & Szolovits, P. (2007). Evaluating the state-of-the-art in automatic de-identification. Journal of the American Medical Informatics Association, 14(5), 550-563.

Orr, Thomas G., and John A. Thurston. "Strangulated non-parasitic cyst of the liver." Annals of surgery 86.6 (1927): 901.

Peters, M., Neumann, M., Iyyer, M., Gardner, M., Clark, C., & Lee, K. Luke Zettlemoyer. 2018. Deep contextualized word representations. In Proceedings of the Conference of the North American Chapter of the Association for Computational Linguistics: Human Language Technologies (vol. 1).

Yadav, Vikas, and Steven Bethard. "A survey on recent advances in named entity recognition from deep learning models." arXiv preprint arXiv:1910.11470 (2019).

* cited by examiner

1. Sentence: "Company Name, Inc, 123 Oakland Street, Suite 123 Emeryville, CA 94608 Attn: [***]."

Entities to be extracted:

$\underbrace{\text{Contracting Party}}$

"Company Name, Inc, 123 Oakland Street, Suite 123 Emeryville, CA 94608 Attn: [***]."

2. Sentence: "If to Company: Company Name, Inc. 123 Arizona Ave., Suite 150 South San Francisco CA 94080 Attention: Chief Executive Officer."

Entities to be extracted:

Contracting Party   Contracting Party

"If to Company: Company Name, Inc. 123 Arizona Ave., Suite 150 South San Francisco CA 94080 Attention: Chief Executive Officer."

*FIG. 2.*

PRE-TRAINING TECHNIQUES FOR ENTITY EXTRACTION IN LOW RESOURCE DOMAINS

BACKGROUND

Named entity recognition (NER), also called entity extraction, is the task of extracting entities with corresponding type-labels from a given piece of text. This entity extraction task is used in many natural language processing applications, such as information extraction, retrieval, and language understanding.

SUMMARY

Embodiments of the present invention are directed to pre-training techniques for entity extraction models to facilitate domain adaptation in resource-constrained domains. Because the choice of pre-training data influences a model's performance, one or more selection models are used to select a subset of an available source domain corpus based on similarity to a particular target domain corpus. In some embodiments, the sentence selection model(s) are pre-trained on an unlabeled target domain corpus (e.g., using masked language modeling) and/or fine-tuned on a labeled subset of the target domain corpus prior to selecting sentences from the source domain corpus. In some embodiments, a pre-trained and/or fine-tuned sentence selection model is used to encode sentences from the source and target domain corpora into sentence embeddings, the sentence embeddings from the target domain corpus are combined (e.g., averaged) into a combined representation, and a similarity metric (e.g., cosine similarity) is used to identify sentences from the source domain corpus within a threshold of similarity to the combined representation of the target domain corpus. In some embodiments, a pre-trained and/or fine-tuned sentence selection model is used to predict entities in sentences from the source domain corpus, and the sentences with the maximum number of predicted entities are selected. Having selected training sentences from the source domain corpus, an entity extraction model is pre-trained (e.g., using masked language modeling) on the selected sentences, prior to fine-tuning the entity extraction model on labeled sentences from the target domain corpus. As such, the entity extraction model is adapted to perform in a target domain, despite a limited availability of training data in the target domain.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 2 illustrates example sentences and corresponding example entities in a contract domain, in accordance with embodiments of the present invention;

DETAILED DESCRIPTION

Figure 1:
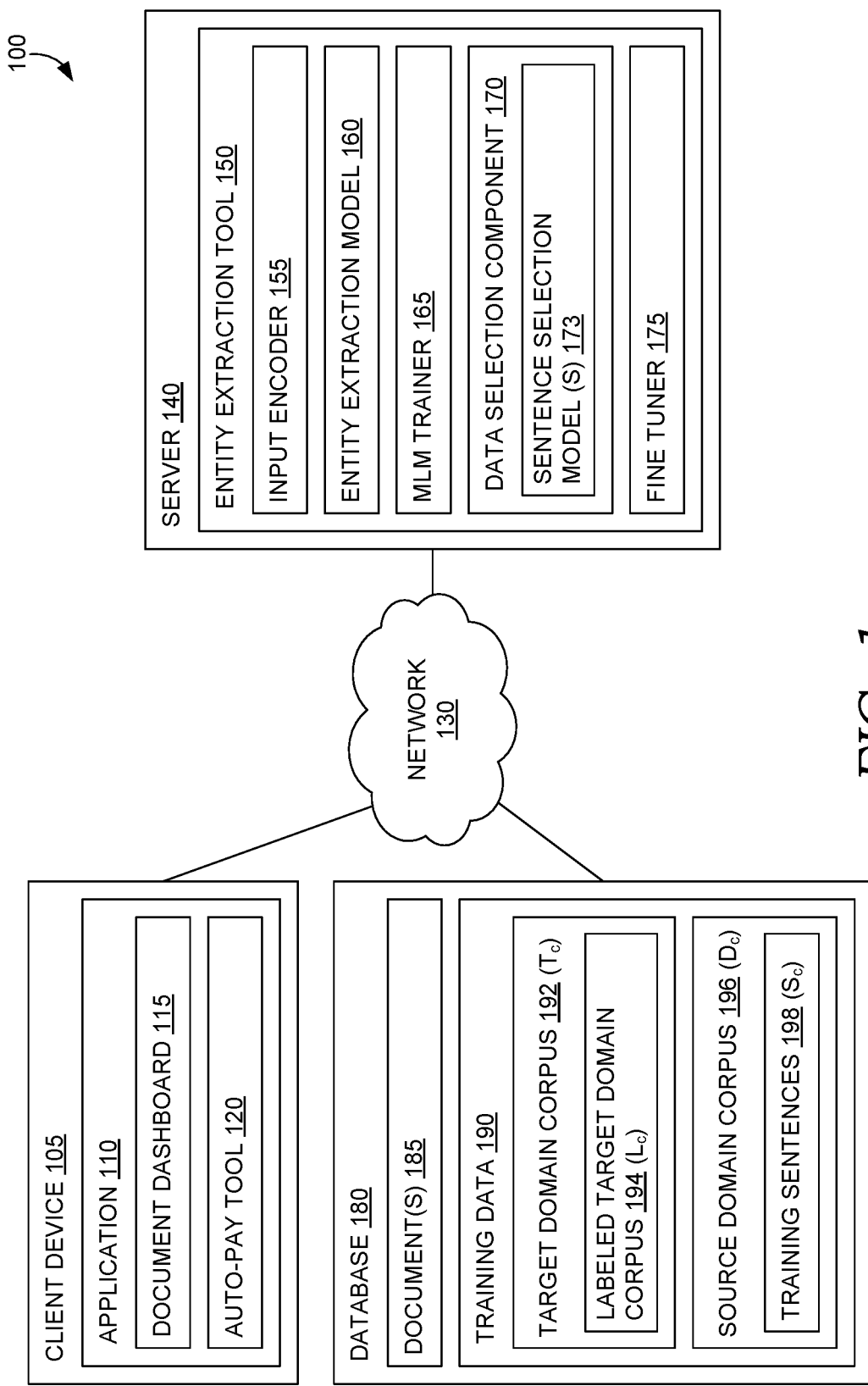
FIG. 1 is a block diagram of an example computing system suitable for entity extraction, in accordance with embodiments of the present invention.

Entity extraction is used in many natural language processing applications, such as information extraction, retrieval, and language understanding. However, state-of-the-art entity extraction models that are specifically trained to operate in a particular domain do not exist for every domain, and the models that are available cannot always be used for every domain. More specifically, state-of-the-art entity extraction models are typically developed on generic training datasets and often do not provide sufficient accuracy (e.g., cannot extract the relevant entities) in certain domains that diverge from the training datasets.

Consider a domain like contracts or financial documents. Companies often have multiple contracts in place with a variety of vendors, customers, and service providers. Businesses like this generally need to know when payments are due and when each of their contracts will be terminated. Typically, analyzing and managing a business's contracts or financial documents is done by done by hand. Some users would like to automatically extract the relevant entities from their contracts (e.g., termination date, payment due date, payment amount, etc.), but state-of-the-art entity extraction models cannot provide sufficient accuracy in this domain (e.g. contracts, financial documents). Pre-trained language models such as Bidirectional Encoder Representations from Transformers (BERT) can be used to try to extract the relevant entities. However, to train a language model in a particular domain, a relevant dataset needs to be collected, labeled, and used to train to the model, and it is often not possible or practicable to obtain the necessary training data. For example, some domains such as contracts or financial documents are resource-constrained (e.g., there is limited data available) due to privacy or security limitations. While a collection of customer contracts may exist, using these contracts to train a model may not be allowed (e.g., legally or contractually, the contracts cannot be viewed by humans and therefore cannot be labeled). Publically available contracts could potentially be used to train a model, but training a model on a generic data can result in insufficient accuracy for a target application, even when the available data is only slightly broader than the target application (e.g., publically available contracts vs. a particular customer's contracts).

There are a few existing techniques that attempt to address training in low resource domains. For example, some prior work has sought to improve entity extraction performance in low resource domains (a target domain) using domain adaptation and/or pre-training strategies. Domain adaptation initially builds a model to work in some source domain where there is typically more training data available, and then attempts to make it work on a target domain. The conventional way to setup a model for entity extraction is to take a pre-trained language model like BERT (e.g., pre-trained on some generic dataset like Wikipedia) and fine-tune (train) it to handle a particular entity extraction task using labeled training data specific to the desired task. However, in certain domains like contracts or financial documents, there is limited labeled data available for this sort of training. Since domain adaptation of a pre-trained entity extraction model typically requires significant amounts of labeled training data to achieve acceptable performance, conventionally trained entity extraction models underperform when the target domain has limited amounts of training data.

Some recent methods have proposed pre-training entity extraction models and/or language models on unlabeled datasets or corpora. Masked language modelling is an unsupervised training technique that takes an unlabeled sentence, tokenizes it, masks certain tokens to create an incomplete sentence, and optimizes a language model to predict the masked tokens to complete the sentence. Some language models like BERT come pre-trained using masked language modelling (e.g., on a generic dataset like Wikipedia), and some techniques continue masked language modeling using data from a target domain. However, pre-training on a large generic corpus can be challenging, especially in resource-constrained domains. Furthermore, applying masked language modeling on a large generic corpus followed by a smaller target domain corpus can produce counter-productive results due to the presence of noisy data. More specifically, some models that are pre-trained this way actually fail to adapt from a particular source domain to a relatively similar target domain. BERT-like language models are very sensitive to pre-training source data, and even a slight variation from source to target domain data (e.g., switching from medical research papers to prescriptions) can negatively impact performance on the target domain. One prior technique attempted to select pre-training data from Wikipedia using metadata in the form of a topics tree to selectively filter content based on a selected category. However, many domains do not have categorized training data available. As such, there is a need for improved training techniques for resource-constrained domains.

Accordingly, embodiments of the present invention are directed to pre-training techniques for entity extraction models to facilitate domain adaptation in resource-constrained domains. Because the choice of pre-training data influences a model's performance, one or more selection models are used to select a subset of available source domain training data for an entity extraction model based on similarity to a particular target domain. An entity extraction model is pre-trained (e.g., using masked language modeling) on the selected sentences from the source domain corpus, prior to fine-tuning the entity extraction model on labeled sentences from the target domain corpus. As such, the entity extraction model is adapted to perform in a target domain, despite a limited availability of training data in the target domain.

As an example, an example chocolate store has a number of contracts in place with a variety of vendors, customers, and service providers. In order to train an entity extraction model to extract certain entities (e.g., termination date, payment due date, payment amount, etc.) from one or more of the chocolate store's contracts, sufficient training data must be identified. In an example embodiment, some or all of the chocolate store's contracts are considered to be a target domain corpus. However, assume the contracts cannot all be labeled with ground truth entities for various reasons, or that is not desirable to label all the contracts, such that a small subset is labeled. There are publically available datasets of contracts that can be used for pre-training, but they are in slightly different domains (e.g., the datasets include more types of contracts than the chocolate store's contracts). Accordingly, in an example implementation, one or more sentence selection models are used to select sentences or some other unit of text from a publically available dataset of contracts, pre-train an entity extraction model on the selected sentences or other text using masked language modeling, and fine-tune the entity extraction model on the labeled contracts of the chocolate store. More generally, given a broad or generic unlabeled source domain corpus ($D_c$), an unlabeled target domain corpus ($T_c$), and a labeled subset ($L_c$) of the target domain corpus $T_c$, a relevant portion of the source domain corpus $D_c$ is selected based on similarity to the target domain corpus $T_c$ and used to pre-train an entity extraction model (e.g., using masked language modeling), prior to fine-tuning on the labeled target domain corpus $L_c$.

In some embodiments, the sentence selection model(s) are pre-trained and/or fine-tuned prior to selecting sentences (or other text) to train the entity extraction model. In some cases, the model(s) used to select sentences and the model being trained for entity extraction are the same model (e.g., the same type of model, the same instance of the same type of model), but this need not be the case. In an example embodiment, a sentence selection model or a portion thereof (e.g., BERT pre-trained on Wikipedia) is pre-trained on an unlabeled target domain corpus (e.g., using masked language modeling) and then used to select sentences from a source domain corpus. In another example embodiment, after pre-training a sentence selection model (or portion thereof) on an unlabeled target domain corpus, the sentence selection model is fine-tuned on the labeled target domain corpus and used to select sentences from a source domain corpus. In yet another example embodiment, after pre-training a sentence selection model (or portion thereof) on an unlabeled target domain corpus, a copy of the pre-trained sentence selection model is made, the copy is fine-tuned on the labeled target domain corpus, and both the pre-trained and fine-tuned sentence selection models are used to select sentences from the source domain corpus.

In some embodiments, the sentence selection model(s) are used to select sentences from the source domain corpus based on similarity to the target domain. In an example implementation, the sentences (or other unit of text) in a source domain corpus and a target domain corpus are encoded by the sentence selection model(s), and a similarity metric (e.g., cosine similarity) is used to select sentences from the source domain corpus that are most relevant to the target domain corpus (e.g., a representative embedding of the target domain corpus, such as an average embedding of its sentence embeddings). In another implementation, each sentence in the source domain corpus and the target domain corpus is separately encoded by two sentence selection models, and the resulting embeddings combined, prior to using a similarity metric to select sentences. In yet another implementation, a sentence selection model effectively recognizes similarity to the target domain corpus through pre-training on the unlabeled target domain corpus and/or fine-tuning on the labeled target domain corpus. Accordingly, the pre-trained and/or fine-tuned sentence selection model is used to predict entities in sentences (or other unit of text) from the source domain corpus, and the sentences with the maximum number of predicted entities are selected.

As such, using techniques described herein, an entity extraction model is domain-adapted to a resource-constrained domain. By selecting sentences from an available source domain corpus based on similarity to a particular target domain, and pre-training using those selected sentences rather than the entire source domain corpus, the present techniques effectively reduce noise in the training data and reduce the shift from source to target domain pre-training data over prior techniques. Furthermore, by using a measure of similarity such as cosine similarity to select sentences from a source domain corpus, relevant training data is selected from the source domain corpus without the need for source domain corpus metadata, which is often unavailable. As a result, the present techniques improve performance in resource-constrained target domains over prior techniques.

Example Entity Extraction Environment

Referring now to FIG. 1, a block diagram of example environment 100 suitable for use in implementing embodiments of the invention is shown. Generally, environment 100 is suitable for entity extraction, and, among other things, facilitates training and/or operating an entity extraction model. At a high level, environment 100 includes client device 105, server 140, and database 180.

Depending on the implementation, client device 105 and/or server 140 are any kind of computing device capable of facilitating entity extraction. For example, in an embodiment, client device 105 and/or server 140 are each a computing device such as computing device 700 of FIG. 7. In some embodiments, client device 105 and/or server 140 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., machine learning models) used in some embodiments of the technologies described herein. For example, in some implementations, client device 105, server 140, and/or database 180 comprise a data store (or computer data memory). Further, although database 180 is depicted as a single data store component, in some embodiments, client device 105, server 140, and/or database 180 comprise one or more corresponding data stores (e.g., a distributed storage network), the data store(s) are implemented using cloud storage, and/or any data or components described herein are stored on any suitable data store(s) and/or any suitable device(s).

In the example illustrated in FIG. 1, the components of environment 100 communicate with each other via a network 130. In some non-limiting example implementations, network 130 includes one or more local area networks (LANs) and/or wide area networks (WANs). Such networking environments are commonplace in offices, enterprise-wide computer networks, intranets, and the Internet.

In the example illustrated in FIG. 1, client device 105 includes application 110 with document dashboard 115 and auto-pay tool 120, and server 140 includes entity extraction tool 150. In some embodiments, document dashboard 115, auto-pay tool 120, entity extraction tool 150, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Some example applications include ADOBE® SIGN, a cloud-based e-signature service, and ADOBE ACROBAT®, which allows users to view, create, manipulate, print, and manage documents. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, document dashboard 115, auto-pay tool 120, and/or entity extraction tool 150 coordinate via network 130 to execute the functionality described herein. In another example, document dashboard 115, auto-pay tool 120, and/or entity extraction tool 150 (or some portion thereof) are integrated into a common application executable on a single device. In yet another example, document dashboard 115, auto-pay tool 120, and/or entity extraction tool 150 (or some portion thereof) are distributed across some other number and/or type(s) of devices. These are just examples, and any suitable allocation of functionality among these or other devices is possible within the scope of the present disclosure.

To begin with a high-level overview of an example workflow through the configuration illustrated in FIG. 1, assume a user has (or has access to) a collection of document(s) 185 and wants to view certain parts (entities) from those documents without opening and viewing each individual document. In some cases, document(s) 185 are in a particular domain without much labeled training data available, or where it is not possible or practicable to label or otherwise obtain enough labeled training data to train an entity extraction model to extract the desired entities with a desired accuracy.

In some embodiments, the user operates document dashboard 115 to identify document(s) 185 or input an indication that entities should be extracted from document(s) 185, and application 110 and entity extraction tool 150 coordinate (e.g., via network 130) to train or adapt entity extraction model 160 to an appropriate domain for document(s) 185. In some embodiments, application 110 is designed specifically for documents in a particular domain (e.g., contracts or financial documents). In some cases, document dashboard 115 prompts the user to identify an applicable domain for document(s) 185 (e.g., contracts, financial documents, biomedical documents, artificial intelligence research papers, scientific publications, political publications, musical publications, literary publications). Depending on the applicable domain, a corresponding generic source domain corpus 196 ($D_c$) (e.g., a dataset comprising example contracts of a different business, or example contracts that are a different type of contract than contracts in document(s) 185) is identified and/or is uploaded. In some embodiments, sentences are extracted from document(s) 185 (e.g., by entity extraction tool 150) and used as target domain corpus 192 ($T_c$). In other embodiments, some other target domain corpus 192 ($T_c$) is identified or uploaded. Finally, assume some of the sentences from target domain corpus 192 are labeled (e.g., using inside-outside-beginning tagging, BIOES/BILOU tagging, or some other tagging scheme) and identified as labeled target domain corpus 194 ($L_c$). In an example implementation, document dashboard 115 prompts and/or accepts inputs from the user identifying ground truth entities (text and corresponding classifications) from a subset of target domain corpus 192 ($T_c$) using any known labeling technique.

As such, having identified relevant training data, application 110 triggers entity extraction tool 150 to pre-train entity extraction model 160 on target domain corpus 192, pre-train entity extraction model 160 on training sentences 198 selected from source domain corpus 196, and/or fine-tune entity extraction model 160 on labeled target domain corpus 194. Once entity extraction model 160 is trained, application 110 triggers entity extraction tool 150 to use entity extraction model 160 to extract entities from document(s) 185. In an example implementation, entity extraction tool 150 iteratively feeds successive sentences (or some other unit of text) into entity extraction model 160 to extract and aggregate entities from each document. The types of extracted entities depend on the applicable domain. For contracts or financial documents, example entity classes include contracting parties, payment amounts, payment due dates, and/or payment terms, to name a few examples. As such, entity extraction tool 150 extracts entities from document(s) 185 and sends the extracted entities to document dashboard 115, which causes a user interface to present a representation of the extracted entities (e.g., in a table, chart, or list with rows corresponding to different documents, columns corresponding to different classes of extracted entities, and cells with extracted entity values). In some embodiments, document dashboard 115 accepts one or more inputs identifying one or more extracted entity values, performs a faceted search to identify matching documents with extracted entities that match the identified values, and updates the user interface to present a representation of the matching document(s), their corresponding extracted entities (e.g., class and value), and/or other information.

In some embodiments, auto-pay tool 120 facilitates and triggers automatic payments according to extracted payment terms. In an example implementation, auto-pay tool 120 identifies extracted entities associated with a payment required by a particular contract or financial document of document(s) 185, such as a payment amount, payment due date, recipient identification (e.g., name, address, identification number), recipient account information, and/or other payment information. In some cases, auto-pay tool 120 accepts inputs that identify an originating account, provide authentication information, and/or authorize automated payments from the originating account, and auto-pay tool 120 interfaces (e.g., via network 130) with a payment system (not illustrated in FIG. 1) of a bank, payment company, or other financial service provider to set up, trigger, and/or monitor automatic payments according to the extracted payment terms.

Turning to entity extraction tool 150, in the embodiment illustrated in FIG. 1, entity extraction tool 150 trains entity extraction model 160 and/or uses entity extraction model 160 to extract entities (values predicted to correspond to certain classes of extracted entities) from one or more document(s) 185. Entity extraction tool 150 includes input encoder 155, entity extraction model 160, masked language modeling trainer 165, data selection component 170, and fine tuner 175.

Input encoder 155 extracts, serializes, and/or encodes sentences (or some other unit of text) into an encoded input that entity extraction model 160 understands. Depending on the scenario, input encoder 155 is used to encode inputs for training and/or inference. In an example implementation, input encoder 155 accesses and/or extracts sentences or some other string of text (e.g., from text in document(s) 185, target domain corpus 192, labeled target domain corpus 194, source domain corpus 196, and/or training sentences 198), and tokenizes the sentence or string into a sequence of tokens. In some embodiments, input encoder 155 identifies, extracts, and/or accesses a semantic or language embedding representing the meaning of each token (extracted using any known technique, looked up from a table), and combines (e.g., concatenates) the embeddings for the different tokens in the sequence to generate an encoded input that represents the sequence of tokens and is in a format that entity extraction model 160 understands. In some situations (e.g., for fine-tuning or inference), the encoded input is passed to entity extraction model 160, which extracts entities (e.g., predicts tokens that fall into particular classes) from the encoded input. In other situations (e.g., unsupervised training, such as masked language modelling), input encoder 155 masks some tokens (or their corresponding embeddings) to create a masked input, and the masked input is passed to entity extraction model 160 (or a portion thereof, such as a constituent language model), which attempts to fill in the blanks by predicting the masked tokens. Depending on the scenario, the output of entity extraction model 160 (or a constituent language model) is used to update entity extraction model 160 (e.g., during training) or is provided to application 110 (e.g., for inference).

Generally, entity extraction model 160 evaluates an encoded representation of text (e.g., using attention to accumulate contextual signals from nearby tokens), predicts tokens that fall into particular entities classes, and extracts corresponding entities (values of tokens). In an example implementation, entity extraction model 160 includes a language model (e.g., BERT), one or more classifiers (e.g., a multi-class classifier), and/or some other a neural network. In some embodiments, the language model accepts and processes an encoded input representing a sequence of tokens to generate a contextual embedding corresponding to each token in the sequence, and the contextual embedding for each token is fed into the one or more classifiers to predict whether that token falls into a particular entity class. In an example implementation, entity extraction model 160 includes a classification layer with a number of nodes (e.g., classes) that corresponds to the desired number of entity classes, and when one or more classes are predicted above a threshold confidence for a particular token, the class predicted with the highest confidence is taken as the entity class for that token. The process is repeated to predict classes for each token represented by the encoded input.

In some embodiments where a sentence or other unit of text is longer than entity extraction model 160 can evaluate, input encoder 155 breaks up the sentence into multiple windows of text. For each window, input encoder 155 encodes the text from the window into an encoded input, and entity extraction model 160 predicts class confidence values for each token represented by the encoded input. In some embodiments, the windows are non-overlapping except for the last window. In some embodiments that use overlapping windows, for each token that has multiple predictions (e.g., class confidence values) for a given class, the predictions are averaged to generate to generate an aggregate class confidence value for the given class.

Depending on the scenario, predicted entity classes and/or class confidence values are used in different ways. In some embodiments during fine-tuning (e.g., supervised learning), predicted classes and/or class confidence values are compared with ground truth and used to update entity extraction model 160. In some embodiments during inference, entity extraction model 160 extracts the value of each token predicted to be in a particular entity class, associates the extracted value with the predicted entity class, repeats the process to extract and associate token values from each sentence or string in a particular document with corresponding predicted classes, and returns (e.g., to application 110) a representation of the extracted entities (e.g., token values and their corresponding entity classes). As such, entity extraction model 160 is used to extract entities during training and/or inference.

FIG. 2 illustrates example sentences and corresponding example entities in a contract domain, in accordance with embodiments of the present invention. Assume that the sentences shown in FIG. 2 are obtained (e.g., extracted) from a particular document and that the goal is to recognize and extract the value of the Contracting Party from each example, regardless of what the name actually is. As such, entity extraction model 160 is trained using various techniques described herein to recognize that the token values shown in FIG. 2 are names of a Contracting Party, and to extract those values from sentences 1 and 2.

More specifically, and returning to FIG. 1, in some embodiments, masked language modeling trainer 165, data selection component 170, and/or fine tuner 175 coordinate to train entity extraction model 160. Generally, masked language modeling trainer 165 trains entity extraction model 160 using any known unsupervised learning technique (e.g., without using ground truth labels), including but not limited to masked language modeling and variations thereof. Furthermore, fine tuner 175 trains entity extraction model 160 using any known supervised learning technique (e.g., using ground truth labels).

In some cases, entity extraction model 160 is pre-trained (e.g., using masked language modeling on some source domain corpus, not illustrated in FIG. 1) prior to using the training techniques described herein. Additionally or alternatively, in some embodiments, masked language modeling trainer 165 performs unsupervised training of entity extraction model 160 using text (e.g., sentences) from target domain corpus 192. In some embodiments, data selection component 170 uses one or more sentence selection model(s) 173 to select a subset of source domain corpus 196 (e.g., training sentences 198) based on similarity to target domain corpus 192, and masked language modeling trainer 165 performs unsupervised training of entity extraction model 160 using the selected subset (e.g., training sentences 198). After pre-training using masked language modeling (or some other unsupervised training technique) on target domain corpus 192 and/or training sentences 198, fine tuner 175 performs supervised training of entity extraction model 160 on labeled target domain corpus 194.

In the embodiment illustrated in FIG. 1, data selection component 170 includes sentence selection model(s) 173. Although depicted as separate models, in some embodiments, one or more of sentence selection model(s) 173 are or include the same model as some or all of entity extraction model 160, such that the same instance of the same model is used to select sentences on which to subsequently train itself. In other scenarios, one or more of sentence selection model(s) 173 are or include a different instance of the same type of model as some or all of entity extraction model 160 (e.g., BERT). In yet another example, one or more of sentence selection model(s) 173 and entity extraction model 160 are or include different types of models (e.g., different types of language models).

Generally, data selection component uses sentence selection model(s) 173 to select training sentences 198 (or some other unit of text) on which to train entity extraction model 160. In some embodiments, masked language modeling trainer 165 and/or fine tuner 175 train sentence selection model(s) 173 prior to using sentence selection model(s) 173 to select sentences. In an example embodiment, masked language modeling trainer 165 accesses a base version of sentence selection model 173 (e.g., a language model such as BERT pre-trained on Wikipedia) and pre-trains sentence selection model 173 on target domain corpus 192, and this pre-trained sentence selection model 173 is used to select sentences. In another example embodiment, after pre-training (e.g., a language model of) sentence selection model 173 on target domain corpus 192, fine tuner 175 trains sentence selection model 173 on labeled target domain corpus 194, and the pre-trained and fine-tuned sentence selection model 173 is used to select sentences. In yet another example embodiment, after pre-training (e.g., a language model) sentence selection model 173 on target domain corpus 192, a copy of this pre-trained sentence selection model 173 is made, fine tuner 175 trains the copy the pre-trained sentence selection model 173 on labeled target domain corpus 194, and both the pre-trained and fine-tuned sentence selection models 175 are used to select sentences.

In some embodiments, data selection component 170 uses sentence selection model(s) 173 to select training sentences 198 from source domain corpus 196 based on similarity to target domain corpus 192. In an example implementation, data selection component 170 uses sentence selection model(s) 173 to encode each sentence in source domain corpus 196 and target domain corpus 192 into corresponding embeddings (e.g., as output from a language model of sentence selection model(s) 173). Data selection component 170 combines (e.g., averages) the embeddings for the sentences in target domain corpus 192 into a target corpus embedding, uses the target corpus embedding as a query vector to identify embeddings for sentences from source domain corpus 196 within a threshold of similarity (e.g., a threshold cosine similarity), and identifies the corresponding sentences as training sentences 198.

In some embodiments, data selection component 170 uses multiple sentence selection models 173 (e.g., pre-trained on target domain corpus 192, fine-tuned on labeled target domain corpus 194) to select training sentences 198 from source domain corpus 196 based on similarity to target domain corpus 192. In an example implementation, data selection component 170 uses each selection model(s) 173 to generate corresponding embeddings for each sentence in source domain corpus 196 and target domain corpus 192. Data selection component 170 combines (e.g., concatenates) the embeddings generated by the multiple sentence selection models 173 for each sentence to generate composite embeddings for each sentence. Data selection component 170 combines (e.g., averages) the composite embeddings for the sentences in target domain corpus 192 into a target corpus embedding, uses the target corpus embedding as a query vector to identify composite embeddings for sentences from source domain corpus 196 having a measure of vector similarity (e.g., cosine similarity) falling within a threshold, and identifies the corresponding sentences as training sentences 198.

In some embodiments, data selection component 170 uses sentence selection model(s) 173 pre-trained and/or fine-tuned on target domain corpus 192 to select training sentences 198 from source domain corpus 196 based on similarity to target domain corpus 192. In an example implementation, data selection component 170 uses pre-trained and/or fine-tuned sentence selection model(s) 173 to predict entities that are present in each sentence from source domain corpus 196, determines the sentences with the maximum number of predicted entities (e.g., 5-10), and identifies those sentences as training sentences 198.

As such, in some embodiments, data selection component 170 uses sentence selection model(s) 173 to select training sentences 198 from source domain corpus 196, and masked language modeling trainer 165 trains entity extraction model 160 on training sentences 198. This selectively pre-trained entity extraction model 160, which has now gained better knowledge about the target domain, is further fine-tuned on labeled target domain corpus 194 by fine tuner 175 for the entity extraction task. The pre-training task helps entity extraction model 160 to easily adapt and improve its performance significantly on a new domain with very limited data.

Example Flow Diagrams

With reference now to FIGS. 3-8, flow diagrams are provided illustrating various methods for training an entity extraction model. Each block of the methods 300, 400, 500, 600, 700, and 800 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Figure 3:
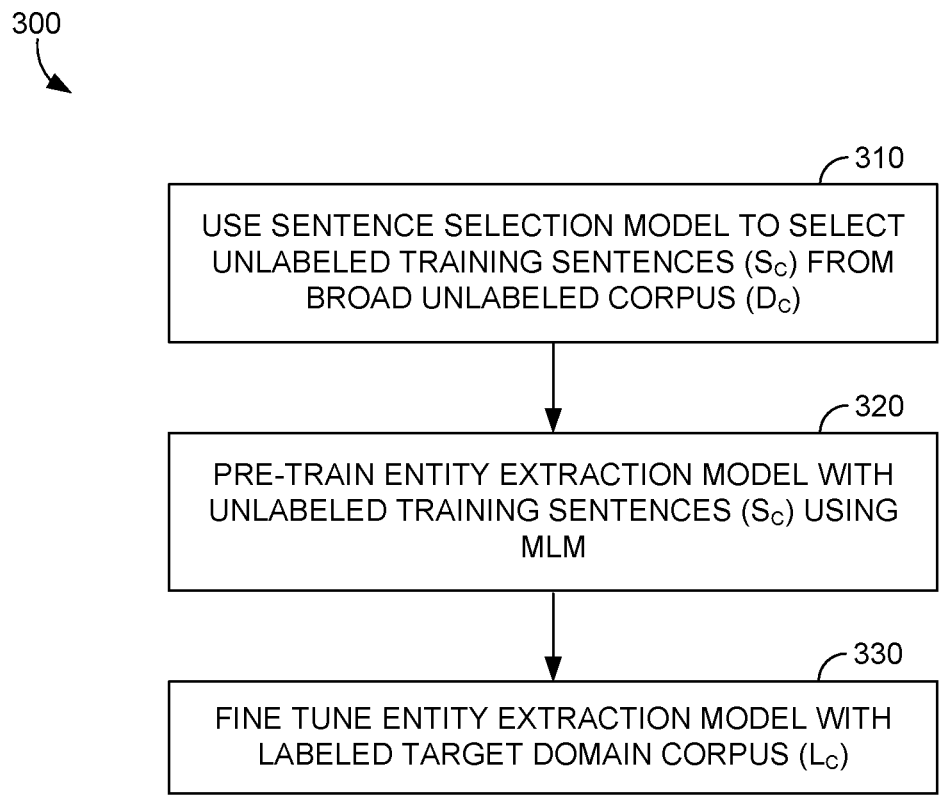
FIG. 3 is a flow diagram showing a method for pre-training an entity extraction model using sentences selected by a sentence selection model, in accordance with embodiments of the present invention.

Turning initially to FIG. 3, FIG. 3 illustrates a method 300 for pre-training an entity extraction model using sentences selected by a sentence selection model, in accordance with embodiments described herein. Initially at block 310, a sentence selection model (e.g., sentence selection model 173) is used to select unlabeled training sentences ($S_c$) (e.g., training sentences 198) from a broad unlabeled corpus ($D_c$) (e.g., source domain corpus 196), and at block 320, an entity extraction model (e.g., entity extraction model 160) is pre-trained (e.g., by masked language modeling trainer 165) with the unlabeled training sentences ($S_c$) using masked language modeling, or some other unsupervised learning technique. Although here and elsewhere, the broad unlabeled corpus ($D_c$) and the unlabeled training sentences ($S_c$) are described as being unlabeled, they could be labeled (at least in part) and the labels are simply not used during unsupervised learning. At block 330, the entity extraction model is fine-tuned (e.g., by fine tuner 175) with a labeled target domain corpus ($L_c$) (e.g., labeled target domain corpus 194).

Figure 4:
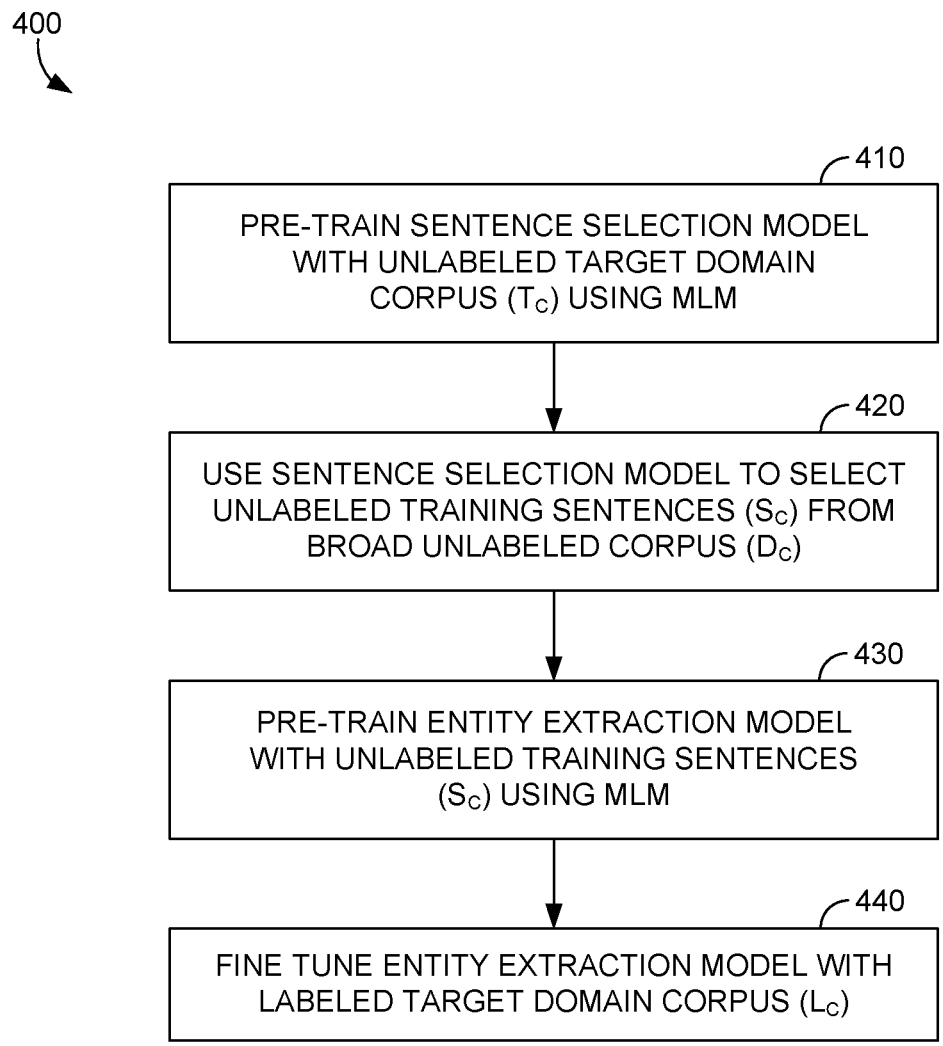
FIG. 4 is a flow diagram showing a method for pre-training an entity extraction model using sentences selected by a pre-trained sentence selection model, in accordance with embodiments of the present invention.

Turning now to FIG. 4, FIG. 4 illustrates a method 400 for pre-training an entity extraction model using sentences selected by a pre-trained sentence selection model, in accordance with embodiments described herein. Initially at block 410, a sentence selection model (e.g., sentence selection model 173) is pre-trained (e.g., by masked language modeling trainer 165) with an unlabeled target domain corpus ($T_c$) (e.g., target domain corpus 192) using masked language modeling, or some other unsupervised learning technique. At block 420, the sentence selection model is used to select unlabeled training sentences ($S_c$) (e.g., training sentences 198) from a broad unlabeled corpus ($D_c$) (e.g., source domain corpus 196), and at block 430, an entity extraction model (e.g., entity extraction model 160) is pre-trained (e.g., by masked language modeling trainer 165) with the unlabeled training sentences ($S_c$) using masked language modeling, or some other unsupervised learning technique. At block 440, the entity extraction model is fine-tuned (e.g., by fine tuner 175) with a labeled target domain corpus ($L_c$) (e.g., labeled target domain corpus 194).

Figure 5:
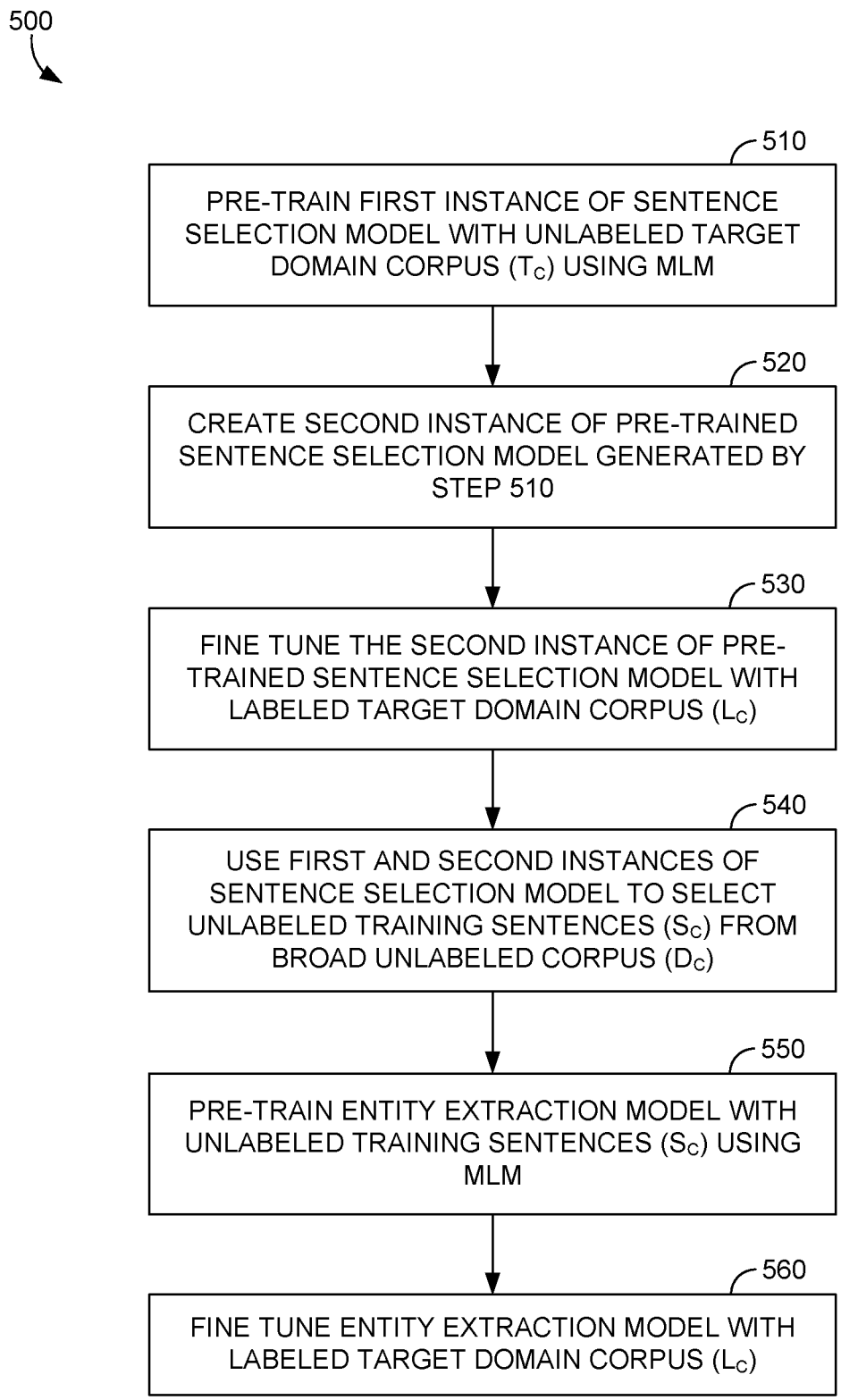
FIG. 5 is a flow diagram showing a method for pre-training an entity extraction model using sentences selected using pre-trained and fine-tuned sentence selection models, in accordance with embodiments of the present invention.

Turning now to FIG. 5, FIG. 5 illustrates a method 500 for pre-training an entity extraction model using sentences selected using pre-trained and fine-tuned sentence selection models, in accordance with embodiments described herein. Initially at block 510, a first instance of sentence selection model (e.g., one of sentence selection model(s) 173) is pre-trained (e.g., by masked language modeling trainer 165) with an unlabeled target domain corpus ($T_c$) (e.g., target domain corpus 192) using masked language modeling, or some other unsupervised learning technique. At block 520, a second instance of the pre-trained sentence selection model is created. At block 530, the second instance of the pre-trained sentence selection model is fine-tuned (e.g., by fine tuner 175) with a labeled target domain corpus ($L_c$) (e.g., labeled target domain corpus 194). At block 540, the first and second instances of the sentence selection model (e.g., sentence selection model(s) 173) are used to select unlabeled training sentences ($S_c$) (e.g., training sentences 198) from a broad unlabeled corpus ($D_c$) (e.g., source domain corpus 196). At block 550, an entity extraction model (e.g., entity extraction model 160) is pre-trained (e.g., by masked language modeling trainer 165) with the unlabeled training sentences ($S_c$) using masked language modeling, or some other unsupervised learning technique. At block 560, the entity extraction model is fine-tuned (e.g., by fine tuner 175) with the labeled target domain corpus ($L_c$).

Figure 6:
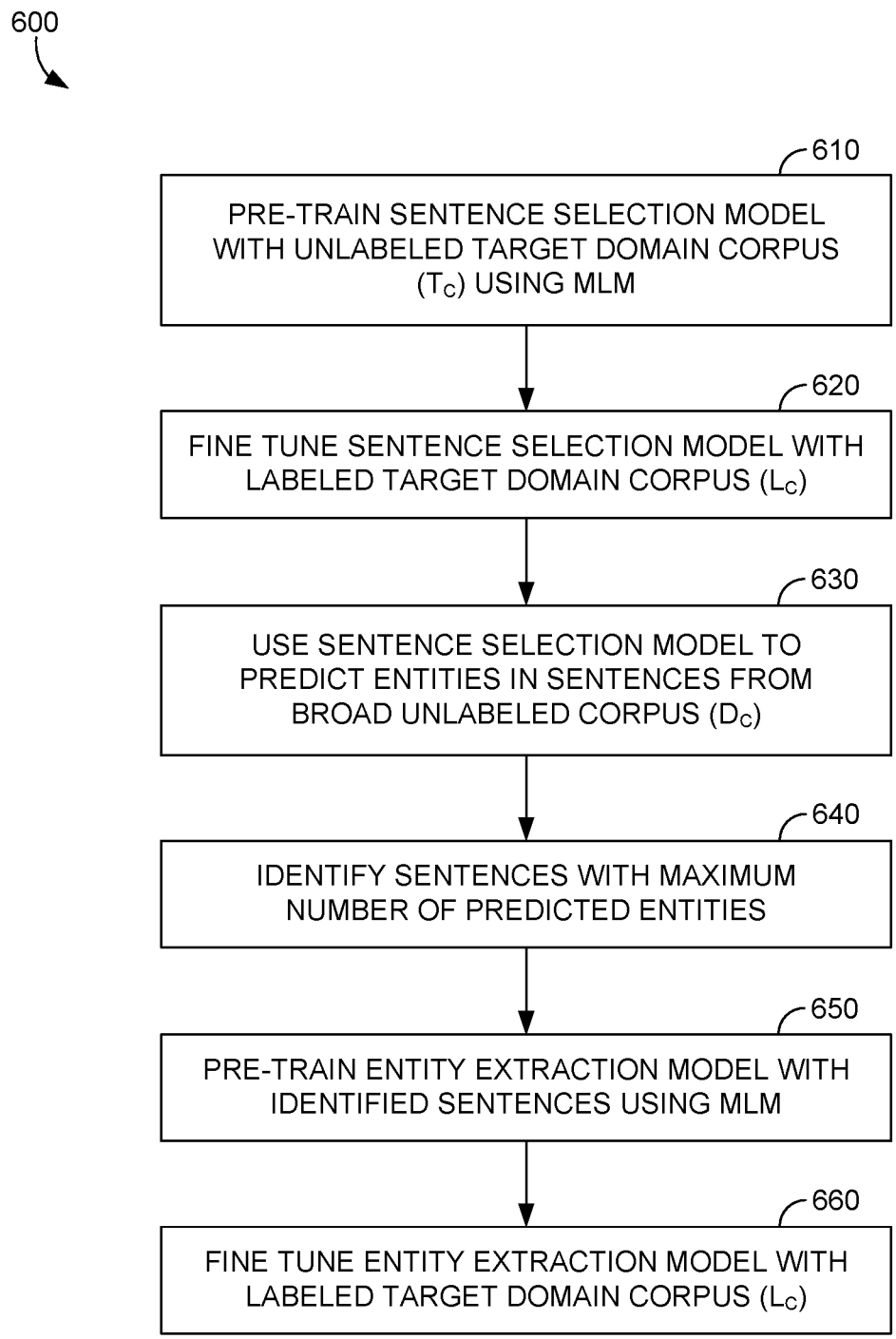
FIG. 6 is a flow diagram showing a method for pre-training an entity extraction model using sentences with the maximum number of predicted entities, in accordance with embodiments of the present invention.

Turning now to FIG. 6, FIG. 6 illustrates a method 600 for pre-training an entity extraction model using sentences with the maximum number of predicted entities, in accordance with embodiments described herein. Initially at block 610, a sentence selection model (e.g., sentence selection model 173) is pre-trained (e.g., by masked language modeling trainer 165) with an unlabeled target domain corpus ($T_c$) (e.g., target domain corpus 192) using masked language modeling, or some other unsupervised learning technique. At block 620, the sentence selection model is fine-tuned (e.g., by fine tuner 175) with a labeled target domain corpus ($L_c$) (e.g., labeled target domain corpus 194). At block 630, the sentence selection model is used to predict entities in sentences from a broad unlabeled corpus ($D_c$) (e.g., source domain corpus 196), and at block 640, the sentences with the maximum number of predicted entities are identified (e.g., by data selection component 170). At block 650, an entity extraction model (e.g., entity extraction model 160) is pre-trained (e.g., by masked language modeling trainer 165) with the unlabeled training sentences ($S_c$) using masked language modeling, or some other unsupervised learning technique. At block 660, the entity extraction model is fine-tuned (e.g., by fine tuner 175) with the labeled target domain corpus ($L_c$).

Example Operating Environment

Figure 7:
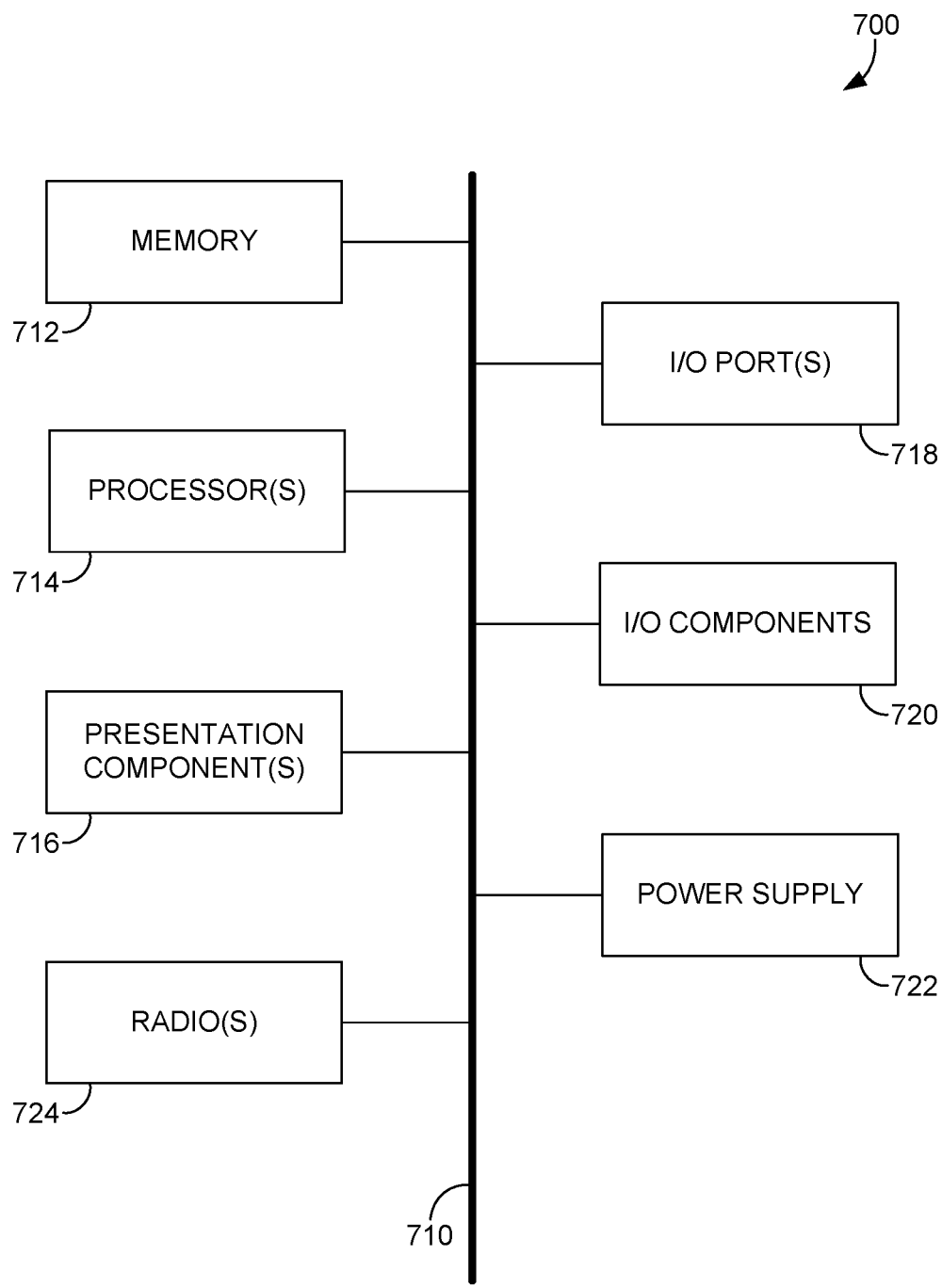
FIG. 7 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in some cases, it is not possible to delineate clear boundaries for different components. In this case, metaphorically, the lines would be grey and fuzzy. As such, the diagram of FIG. 7 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 7 and a "computing device."

Computing device 700 typically includes a variety of computer-readable media. Computer-readable media can be any available media that can be accessed by computing device 700 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 700. In some cases, computing device 700 is equipped with depth cameras, such as stereoscopic camera systems, infrared camera systems, RGB camera systems, touchscreen technology, and combinations of these, for gesture detection and recognition. Additionally or alternatively, the computing device 700 is equipped with accelerometers or gyroscopes that enable detection of motion, and in some cases, an output of the accelerometers or gyroscopes is provided to the display of computing device 700 to render immersive augmented reality or virtual reality.

Embodiments described herein support entity extraction. The components described herein refer to integrated components of an entity extraction. The integrated components refer to the hardware architecture and software framework that support functionality using the entity extraction system. The hardware architecture refers to physical components and interrelationships thereof and the software framework refers to software providing functionality that can be implemented with hardware embodied on a device.

In some embodiments, the end-to-end software-based system operates within the components of the entity extraction system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
   using a first machine learning model to encode sentences of a source domain corpus and a target domain corpus into sentence embeddings;
   combining the sentence embeddings of the target domain corpus into a target corpus embedding;
   selecting training sentences from the source domain corpus within a threshold of similarity to the target corpus embedding; and
   training a second machine learning model on the training sentences selected from the source domain corpus.

2. The method of claim 1, wherein selecting the training sentences within the threshold of similarity comprises determining cosine similarity between the target corpus embedding and the sentence embeddings of the sentences from the source domain corpus.

3. The method of claim 1, wherein selecting the training sentences within the threshold of similarity comprises using the target corpus embedding as a query vector to identify a set of the sentence embeddings of the source domain corpus within the threshold of similarity to the target corpus embedding.

4. The method of claim 1, wherein the first machine learning model is trained on the target domain corpus prior to using the first machine learning model to encode the sentences.

5. The method of claim 1,
   wherein a first instance of the first machine learning model is trained on the target domain corpus;
   the method further comprising copying the first instance to create a second instance of the first machine learning model;
   wherein the second instance of the first machine learning model is trained on a labeled subset of the target domain corpus;

the method further comprising using the first and second instances of the first machine learning model to encode the sentences.

6. The method of claim 1, wherein the first machine learning model and the second machine learning model include a same type of language model.

7. The method of claim 1, further comprising:
using the second machine learning model to extract one or more token values of one or more corresponding entity classes from one or more contracts; and
causing a document dashboard to present a representation of the one or more token values and the one or more corresponding entity classes.

8. The method of claim 1, further comprising:
using the second machine learning model to extract one or more values of one or more payment terms from one or more contracts; and
causing a document dashboard to present a representation of the one or more token values and the one or more corresponding entity classes.

9. The method of claim 1, wherein the second machine learning model is trained on the training sentences using masked language modeling.

10. The method of claim 1, wherein after training the second machine learning model on the training sentences selected from the source domain corpus, the second machine learning model is trained on a labeled subset of the target domain corpus.

11. A non-transitory computer-readable medium storing computer-executable instructions that, when executed by a processing device, cause the processing device to:
use a first machine learning model to predict entities from sentences of a source domain corpus;
select as training sentences a set of the sentences that have a maximum number of the predicted entities; and
train a second machine learning model on the training sentences selected from the source domain corpus.

12. The non-transitory computer-readable medium of claim 11, wherein the computer-executable instructions, when executed by the processing device, further cause the processing device to train the second machine learning model on a labeled subset of a target domain corpus after training the second machine learning model on the training sentences selected from the source domain corpus.

13. The non-transitory computer-readable medium of claim 11, wherein the computer-executable instructions, when executed by the processing device, further cause the processing device to train the first machine learning model on a target domain corpus using unsupervised learning prior to using the first machine learning model to predict the entities.

14. The non-transitory computer-readable medium of claim 11, wherein the computer-executable instructions, when executed by the processing device, further cause the processing device to train the first machine learning model on a labeled subset of a target domain corpus prior to using the first machine learning model to predict the entities.

15. The non-transitory computer-readable medium of claim 11, wherein the computer-executable instructions, when executed by the processing device, further cause the processing device to train the first machine learning model on a target domain corpus using unsupervised learning and on a labeled subset of the target domain corpus using supervised learning prior to using the first machine learning model to predict the entities.

16. The non-transitory computer-readable medium of claim 11, wherein training the second machine learning model on the training sentences selected from the source domain corpus comprises using masked language modeling.

17. The non-transitory computer-readable medium of claim 11, wherein the computer-executable instructions, when executed by the processing device, further cause the processing device to:
use the second machine learning model to extract one or more token values of one or more corresponding entity classes from one or more contracts; and
cause a document dashboard to present a representation of the one or more token values and the one or more corresponding entity classes.

18. The non-transitory computer-readable medium of claim 11, wherein the computer-executable instructions, when executed by the processing device, further cause the processing device to:
use the second machine learning model to extract one or more values of one or more payment terms from one or more contracts; and
trigger a payment according to the one or more values of the one or more payment terms.

19. A system comprising:
a memory component; and
one or more hardware processors coupled to the memory component, the one or more hardware processors to perform operations comprising:
receiving a first training sentence from a target domain corpus into a machine learning model; and
training the machine learning model based on the first training sentence using unsupervised learning to generate a trained machine learning model that is used to select training sentences from a source domain corpus based on predicted entities from sentences of the source domain corpus.

20. The system of claim 19, the operations further comprising training the machine learning model on a labeled subset of the target domain corpus using supervised learning to generate the trained machine learning model.

* * * * *